(12) United States Patent
Endo et al.

(10) Patent No.: US 6,577,440 B2
(45) Date of Patent: Jun. 10, 2003

(54) OPTICAL FIBER FOR OPTICAL AMPLIFIER AND FIBER OPTIC AMPLIFIER

(75) Inventors: Shinji Endo, Yokohama (JP); Shinji Ishikawa, Yokohama (JP); Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/842,008

(22) Filed: Apr. 26, 2001

(65) Prior Publication Data

US 2001/0036006 A1 Nov. 1, 2001

Related U.S. Application Data

(63) Continuation-in-part of application No. 09/314,973, filed on May 20, 1999, now Pat. No. 6,243,196.

(51) Int. Cl.[7] .................................................. H01S 3/00
(52) U.S. Cl. .................................................. 359/341.5
(58) Field of Search ........................... 359/341.5, 341.1; 372/6

(56) References Cited

U.S. PATENT DOCUMENTS

| | | | | |
|---|---|---|---|---|
| 5,058,976 A | * | 10/1991 | DiGiovanni et al. | 359/173 |
| 5,274,734 A | * | 12/1993 | Jin et al. | 385/142 |
| 5,412,672 A | * | 5/1995 | Ainslie et al. | 372/6 |
| 6,236,496 B1 | * | 5/2001 | Yamada et al. | 359/341 |

FOREIGN PATENT DOCUMENTS

| | | |
|---|---|---|
| EP | 0442 553 A1 | 8/1991 |
| EP | 0 469 795 A1 * | 2/1992 |
| EP | 0 469 795 | 2/1992 |
| EP | 4-298724 | 10/1992 |
| EP | 0522201 A1 | 1/1993 |
| EP | 0848463 A2 | 6/1998 |
| EP | 0 851 544 A1 * | 7/1998 |
| EP | 0 851 544 | 7/1998 |
| JP | 03-272723 | 12/1991 |
| JP | 4-273187 | 9/1992 |
| JP | 4-369280 | 12/1992 |
| JP | 5-63259 | 3/1993 |
| JP | 6-224511 | 8/1994 |
| JP | 7-234423 | 9/1995 |
| JP | 10-229238 | 8/1998 |
| JP | 10-261828 | 9/1998 |

OTHER PUBLICATIONS

Endo et al, "High Concentration Er–Doped Fiber for Efficient L–Band Amplification with Short Length", pp 1356 and 1357.*

(List continued on next page.)

Primary Examiner—Mark Hellner
(74) Attorney, Agent, or Firm—McDermott, Will & Emery (57) ABSTRACT

An optical fiber for optical amplification used for 1.58 μm band signal light amplification, at least a core region thereof being doped with Er has a core region at least a part thereof made of silica glass co-doped with Ge and Al together with Er, and Er average atomic concentration in the core region is from 1000 wt-ppm to 3000 wt-ppm inclusive, and cutoff wavelength is from 1.3 μm to 1.5 μm inclusive.

6 Claims, 8 Drawing Sheets

OTHER PUBLICATIONS

Ono et al, "1.58 um band Er3+–doped fiber amplifier pumped in the 0.98 and 1.48 um bands" (1997), Electronic Letters, vol. 33, No. 10, pp 876 and 878.*

Lumbolt et al, "Quantum Limited Noise figure Operation of High Gain Erbium Doped Fiber Amplifiers" (1993); Journal of Light wave Technology, vol. 11, No. 8. pp 1344–1352.*

H. Ono et al., "Gain–Flattened $Er^{3+}$–Doped Fiber Amplifier for a WDM Signal in the 1.57–1.60–$\mu$m Wavelength Region", IEEE Photonics Technology Letters, vol. 9, No. 5, May 1, 1997, pp. 596–598.

H. Ono et al., "Low–noise and high–gain 1.58$\mu$m and $Er^{3+}$–doped fiber amplifiers with cascade configurations", Electronics Letters, vol. 33, No. 17, Aug. 14, 1997, p. 1477.

H. Ono et al., "1.58$\mu$m band $Er^{3+}$–doped fiber amplifier pumped in the 0.98 and 1.48$\mu$m bands", Electronics Letters, vol. 33, No. 10, May 8, 1997, p. 876.

A. Ghatak et al., "Introduction: The fiber optics revolution", University Press.

H. Ono et al., "1.58$\mu$m Band Gain–Flattened Erbium–Dopen Fiber Amplifiers for WDM Transmission Systems", Journal of Lightwave Technology, vol. 17, No. 3, Mar. 1999, pp. 490–496.

"Super–wide band optical fiber technology capable of simultaneously amplifying communication wavelength band", NTT Technical Journal, Nov. 1998, p. 76–81.

"High gain per unit length silica–based erbium doped fiber for 1580nm band amplification", S. Ishikawa et al., OAA, 1998, p. 111–114.

"High gain, broadband, 1·6$\mu$m $Er^3$+ doped silica fiber amplifier", J. F. Massicott, et al., Electronics Letters, Sep. 27, 1990, vol. 26, No. 20, p. 1645–1646.

International Preliminary Examination Report, Feb. 17, 2000.

"High Gain Per Unit Length Silica–Based Erbium Doped Fiber for 1580nm Band Amplification", S. Ishikawa et al., Sumitomo Electric Industries, Ltd.

"High Gain, Broadband, 1.6$\mu$m $Er^{3+}$ Doped Silica Fiber Amplifier", Electronics Letters, vol. 26, No. 20, Sep. 27, 1990, pp. 1645–1646.

"Comparison of amplification characteristics of 1.58 and 1.55$\mu$m band EDFAs", H. Ono et al., Electronics Letters, vol. 34, No. 15, Jul. 23, 1998, pp. 1509–1510.

"A 1.58$\mu$m Band $Er^{3+}$–Doped Fluoride Fiber Amplifier for WDM Transmission Systems", H. Ono et al., $2^{nd}$ Optoelectronics & Communications Conference (OECC '97) Technical Digest, Jul. 1997, Seoul, Korea, pp. 240–241.

"Gain–Flattened $Er^{3+}$–Doped Fiber Amplifier for a WDM Signal in the 1.57–1.60–$\mu$m Wavelength Region", H. Ono et al., IEEE Photonics Technology Letters, vol. 9, No. 5, May 1997, pp. 596–598.

Endo et al, "High Concentration Er–Doped Fiber for Efficient L–Band Amplification with Short Length", pp. 1356 and 1357.

Ono et al, "1.58$\mu$m band Er3+–doped fiber amplifier pumped in the 0.98 and 1.48 $\mu$m bands" (1997), Electronic Letters, vol. 33, No. 10, pp 876–878.

* cited by examiner

OPTICAL FIBER FOR OPTICAL AMPLIFIER AND FIBER OPTIC AMPLIFIER

RELATED APPLICATION

This is a continuation-in-part application of application Ser. No. 09/314,973 filed on May 20, 1999 now U.S. Pat. No. 6,243,196.

BACKGROUND OF THE INVENTION

1. Field of the Invention

The present invention relates to an optical fiber amplifier for receiving pumping light and signal light, amplifying the signal light, and outputting thus amplified signal light; and an optical fiber for optical amplification employed in this optical fiber amplifier. In particular, the present invention relates to an optical fiber for optical amplifier in which at least a part of its core is doped with erbium, and an optical fiber amplifier using this optical fiber.

2. Related Background Art

As a technique for increasing the amount of transmittable information, i.e., channel capacity, in optical communications networks, wavelength division multiplexing (WDM) communications technology has been known.

In the WDM communications, there has been a demand for developing a super-wide band optical fiber amplifier which can simultaneously amplify WDM signal lights. An example of such a technology is disclosed in Makoto Yamada et al., "Super-wide Band Optical Fiber Technology Capable of Simultaneously Amplifying Communication Wavelength Band" (NTT Technical Journal, November issue, 1998, pp. 76–81). This publication discloses an optical amplifier in which an optical fiber amplifier section using an Er-doped optical fiber having an amplification region in the wavelength band of 1.55 μm and an optical fiber amplifier section using an Er-doped optical fiber having an amplification region in the wavelength band of 1.58 μm are connected in parallel, thereby yielding a wide flat gain region over both 1.55 μm and 1.58 μm bands.

SUMMARY OF THE INVENTION

However, the amplification factor per unit length (gain per unit length) of the Er-doped optical fiber conventionally employed in the Er-doped optical fiber amplifier in the 1.58 μm band is smaller than that in the 1.55 μm band by at least one order of magnitude. Therefore, for obtaining a signal gain equivalent to that in the 1.55 μm band, it is necessary for the optical fiber for amplifying the 1.58 μm band to have a length at least 10 times that for the 1.55 μm band. Thus it reaches several hundred meters. It is disadvantageous in that the apparatus increases its size.

For improving the gain per unit length of an optical fiber for amplification, a technique for increasing the concentration of Er so as to enhance the absorption of pumping light by Er may be considered. However, increasing the Er concentration causes the concentration quenching, thereby lowering energy conversion efficiency. A concentration of about 1000 wt-ppm has conventionally been considered a limit for Er ion concentration. It makes thus difficult to improve the gain per unit length.

In view of the above-mentioned problems, it is an object of the present invention to provide an optical fiber for optical amplification having a high gain per unit length in the 1.58 μm band, and an optical fiber amplifier using the same.

As a result of diligent studies for overcoming the above-mentioned problems, the inventors have found that suppressing the association of Er ions by co-doping of Al restrains the concentration quenching. This indicates increasing the Er concentration greater than conventional fiber. Further, as a technique for increasing the amount of Er absorption, enhancing the overlap between the Er-doped area and optical power distribution is considered. For realizing this, the inventors have found it effective to shift the cutoff wavelength to the longer wavelength side. It enhances the light confinement in the core.

Namely, shifting the cutoff wavelength to the longer wavelength side enhances the light confinement in the core, thereby increasing the absorption by Er. Also, the limit for concentration of doped Er where the concentration quenching occurs shifts to the higher concentration region, whereby the amount of Er ions can be increased. As increasing the concentration of doped Er and shifting the cutoff wavelength to the longer wavelength side, an optical fiber for optical amplification having a high gain per unit length can be obtained. In addition, it is also effective in that bending loss decreases, whereby the optical fiber for optical amplification can be wound into a small coil, so as to be packaged.

The present invention is based on the above-mentioned finding. The optical fiber for optical amplification in accordance with the present invention is an optical fiber for optical amplification used for 1.58 μm band signal amplification, at least a core region thereof being doped with Er, wherein in at least a part of the core region is made of silica glass co-doped with Ge and Al together with Er whose average atomic concentration in the core region is from 1000 wt-ppm to 3000 wt-ppm inclusive, and cutoff wavelength is from 1.3 μm to 1.5 μm inclusive.

Thus shifting the cutoff wavelength to the longer wavelength side enables the core to have an improved optical power confinement coefficient of 0.8 or higher, whereas doped Er of 1000 wt-ppm or more allows the optical amplification in the 1.58 μm band to yield a gain per unit length on a par with that in the 1.55 μm band.

On the other hand, the optical fiber amplifier of the present invention comprises the above-mentioned fiber for optical amplification, a pumping light source which emits pumping light in a 1.48-μm band for exciting the optical fiber for optical amplification, a multiplexer/demultiplexer which introduces the pumping light emitted from the pumping light source into the optical fiber for optical amplification on which the signal lights are incident, and respective optical isolators disposed at input and output ends of the signal lights.

Preferably, the mode field diameter (MFD) of the optical fiber for optical amplification in the 1.58 μm band is 5 μm or more.

Setting the MFD to at least 5 μm is preferable for lowering the power density of signal light. Thereby it reduces nonlinear effects such as distortions in signal waveform caused by self phase modulation and crosstalk of signals caused by four-wave mixing. It is also effective in lowering the splicing loss when it is connected to fibers for signal transmission, thereby becoming advantageous for improving energy conversion efficiency.

The Al concentration in the core region of the optical fiber for optical amplification is preferably 1 wt % or more. And it is more preferably from 5 wt % to 20 wt % inclusive. When the Al concentration is thus set, the association of Er ions would be suppressed, whereby the concentration quenching limit can be shifted to the higher concentration side.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4A is a vertical sectional view of an optical fiber for optical amplification in accordance with the present invention, whereas

FIG. 5A is a vertical sectional view of another embodiment of the optical fiber for optical amplification in accordance with the present invention, whereas

FIGS. 8 and 9 are graphs showing results of characteristic comparison tests of EDF (Erbium-Doped optical Fiber), in which FIG. 8 is a graph showing the EDF length dependence of gain, whereas

FIG. 10 is a graph showing relationships between Er atomic concentration and amplification characteristics, whereas

DESCRIPTION OF THE PREFERRED EMBODIMENTS

In the following, embodiments of the present invention will be explained in detail with reference to the accompanying drawings. To facilitate the comprehension of the explanation, the same reference numerals denote the same parts, where possible, throughout the drawings, and a repeated explanation will be omitted.

Figure 1:
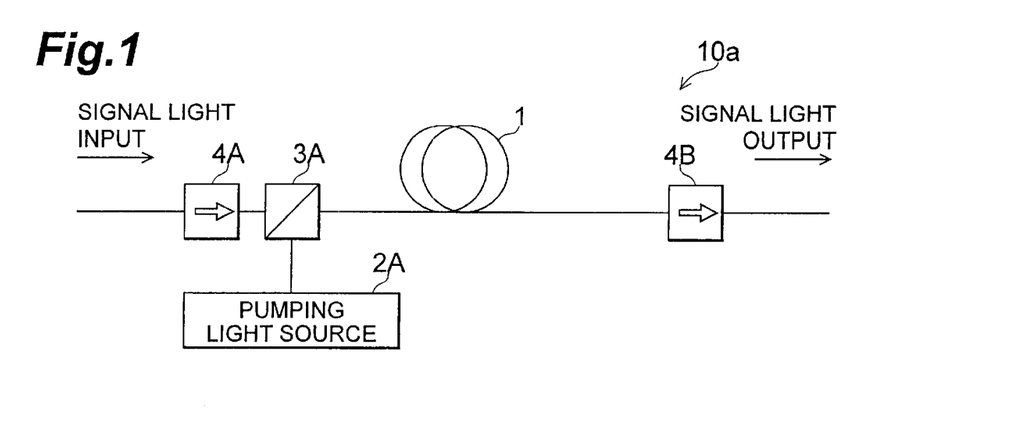
FIGS. 1 to 3 are schematic views showing the overall configurations of different embodiments of the optical fiber amplifier in accordance with the present invention, respectively.
Figure 2:
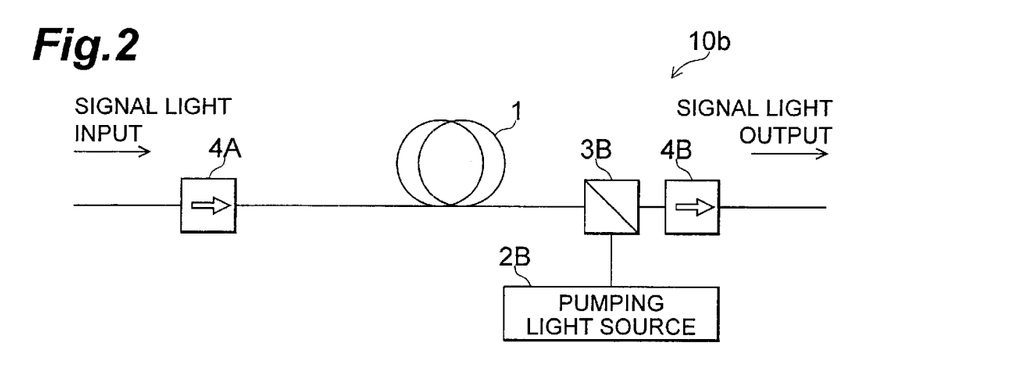
Figure 3:
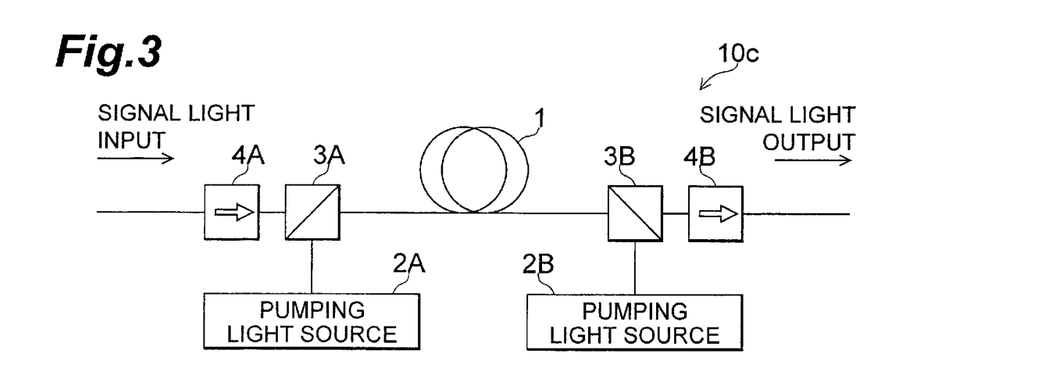

FIGS. 1 to 3 are schematic views showing the respective configurations of different embodiments of the optical fiber amplifier in accordance with the present invention. Each of the embodiments is configured such that signal light to be amplified is inputted from the left end of the drawing and the amplified signal light is outputted from the right end. Each of the respective optical fiber amplifiers 10a, 10b, 10c shown in FIGS. 1 to 3 has an optical fiber 1 for optical amplification in accordance with the present invention, which is an amplification medium for amplifying the signal light. Optical isolators 4A, 4B for suppressing the oscillation of optical fiber amplifier are disposed on the input and output end sides of the signal, respectively. Further provided are pumping light sources 2A and/or 2B for generating pumping light in a 0.98 $\mu$m band or 1.48 $\mu$m band, and a optical multiplexer/demultiplexer 3A and/or 3B for introducing the pumping light generated in the pumping light source 2A and/or 2B into the optical fiber 1 on which the signal lights are incident.

Depending on from which direction the pumping light is introduced into the optical fiber 1, the optical amplifiers are roughly classified into three types. The optical amplifier 10a in which signal light and pumping light are combined together and guided to the optical fiber 1 as shown in FIG. 1 is referred to as forward pumping system. The optical fiber amplifier 10b in which pumping light is introduced from the direction opposite to the signal light as shown in FIG. 2 is referred to as backward pumping system. And the optical fiber amplifier 10c in which pumping light is introduced from both ends of the optical fiber 1 as shown in FIG. 3 is referred to as bidirectional pumping system. A plurality of these amplifiers may be combined in series to constitute an amplifier section.

Figure 4A:
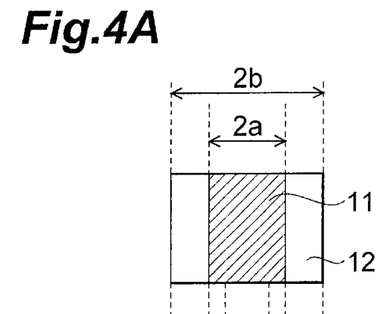
Figure 4B:
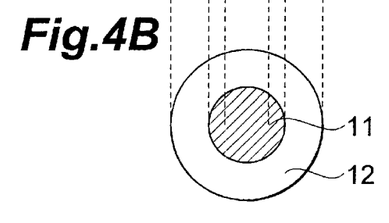
FIG. 4B is a transverse sectional view thereof.
Figure 5A:
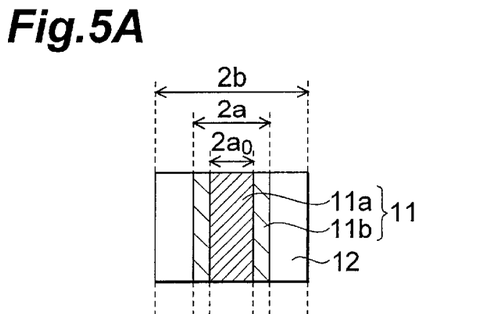
Figure 5B:
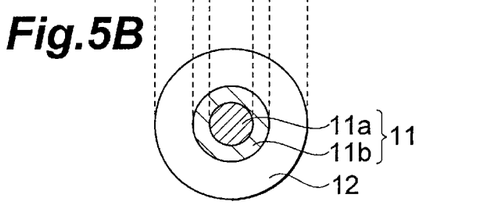
FIG. 5B is a transverse sectional view thereof.

FIGS. 4A, 4B, 5A, and 5B are views showing configurations of the optical fiber 1 employed in the optical fiber amplifiers 10a, 10b, 10c, in which FIGS. 4A and 5A are vertical sectional views, whereas FIGS. 4B and 5B are their corresponding transverse sectional views.

The optical fiber shown in FIGS. 4A and 4B is configured such that a cladding region having an outside diameter of 2b is formed around a core region 11 having an outside diameter of 2a. The core region 11 is made of silica glass co-doped with at least Al, Ge, and Er, whereas the cladding region 12 is made of silica glass, having a refractive index lower than that of the core region 11, to which at least Er has not been added. In the following, such a kind of optical fiber for optical amplification will be referred to as a wholly doped EDF (Erbium-Doped optical Fiber).

The optical fiber shown in FIGS. 5A and 5B differs from the one mentioned above in that the core region 11 is constituted by a fluorescent region 11a in the axial center portion doped with Er and a transparent region 11b therearound not doped with Er. In the following, such a kind of optical fiber for optical amplification will be referred to as a partly doped EDF.

Figure 6:
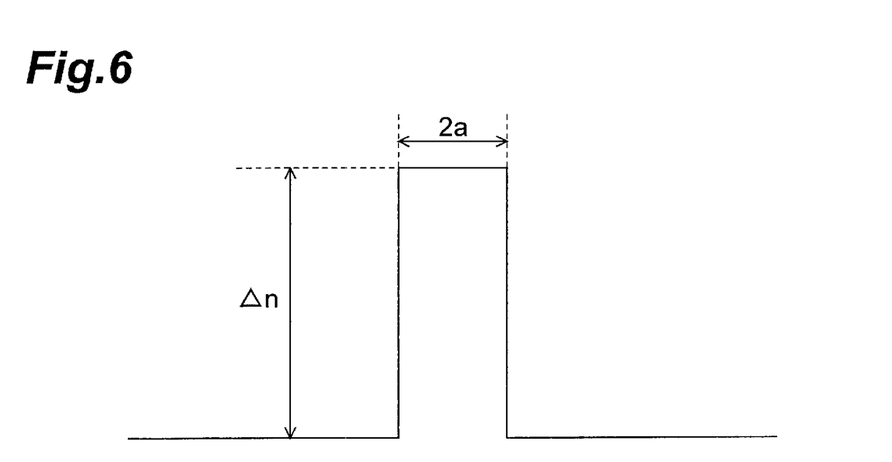
FIG. 6 is a chart showing a refractive index profile of the optical fiber for optical amplification in accordance with the present invention.

Each of the optical fibers for optical amplification has a so-called SI (Step Index) type refractive index profile shown in FIG. 6. The relative refractive index difference between the core region 11 and cladding region 12 will be represented by Δn in the following.

Here, the core region 11 (the fluorescent region 11a when the core region 11 is divided into the fluorescent region 11a and the transparent region 11b) is doped with Er having an atomic concentration of at least 950 wt-ppm but less than 3000 wt-ppm. The Al atomic concentration is preferably 1 wt % or more, more preferably from 5 wt % to 20 wt % inclusive. Further, it is preferable for the optical fiber 1 to have a mode field diameter of 5 μm or more.

In the case where the pumping wavelength of light source 2A or 2B is in the 1.48 μm band, it is preferred that the average Er atomic concentration in the core region of the optical fiber 1 be from 1000 wt-ppm to 3000 wt-ppm inclusive and its cutoff wavelength λc be set from 1.2 μm to 1.5 μm inclusive.

In the case where the pumping wavelength of light source 2A or 2B is in the 0.98 μm band, it is preferred that the average Er atomic concentration in the core region of the optical fiber 1 be from 1500 wt-ppm to 3000 wt-ppm inclusive and its cutoff wavelength λc be set from 0.8 μm to 1.1 μm inclusive.

The optical fiber 1 can be manufactured as follows.

First, a method of making the wholly doped EDF shown in FIGS. 4A and 4B will be explained. A glass pipe made of pure quartz glass or silica glass doped with F, Cl, and the like is prepared for starting materials. Silica glass doped with Ge, P, and the like is deposited in the inside space of the starting pipe by MVCD technique, so as to form a porous body. Thus deposited porous body is impregnated with a solution containing Er and Al. After the completion of impregnation, the solvent is eliminated by drying, and then the porous body is heated so as to become transparent and vitrified, thus forming a region doped with Er and Al. The deposition, impregnation, drying, and vitrification of porous layers are repeated as required, so as to form a multilayer structure, thereby making a fiber preform, which is then drawn to yield a desirable wholly doped EDF.

In the case of the partly doped EDF shown in FIGS. 5A and 5B, a starting pipe is similarly prepared, and then silica glass doped with Ge, P, and the like is initially deposited inside the starting pipe by MVCD technique, so as to form a transparent silica glass layer. Thereafter, as with the wholly doped EDF, the deposition, impregnation, drying, and vitrification of porous layers are repeated, so as to form a multilayer structure, thereby making a fiber preform, which is then drawn to yield a desirable partly doped EDF.

Figure 7:
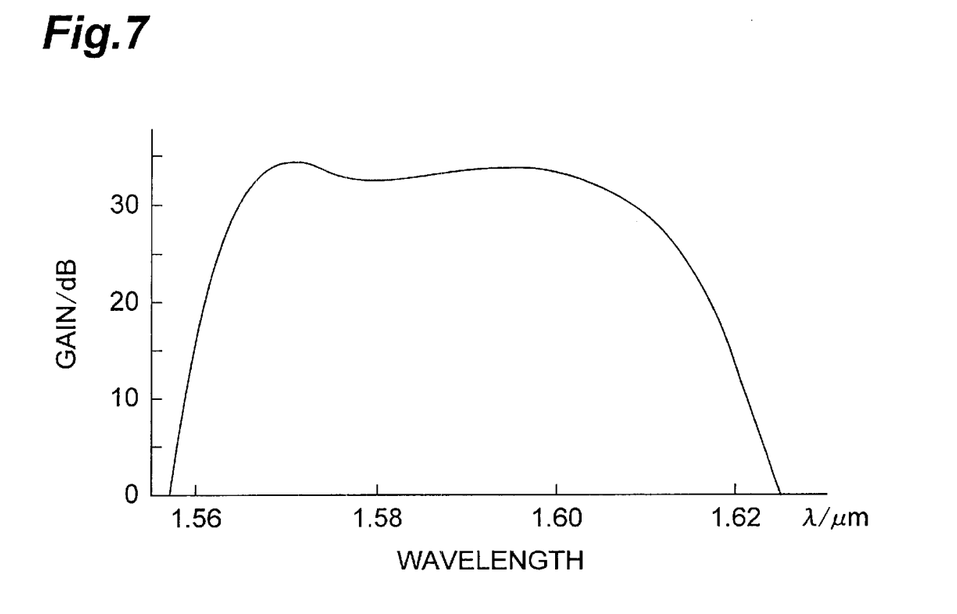
FIG. 7 is a graph showing an amplification waveform according to the optical fiber amplifier in accordance with the present invention.

The amplification characteristic of the optical fiber amplifier 10c of bidirectional excitation system in accordance with the present invention shown in FIG. 3 was studied. For the optical fiber 1, a wholly doped EDF having characteristic values such as those listed in Table 1 was employed. A 1.48-μm band LD (laser diode) was employed as the pumping light source 2A, 2B, and adjustment was effected such that population inversion approaches 40%. FIG. 7 shows the results of measurement of amplification characteristic.

TABLE 1

EDF Characteristic Values

| Characteristics | Characteristic values |
|---|---|
| Er atomic conc. in core region 11 | 1500 wt-ppm |
| Al atomic conc. in core region 11 | 9 wt % |
| Δn | 2.1% |
| λc | 1.45 μm |
| MFD | 4.5 μm |
| Effective core area | 21 μm² |

As shown in FIG. 7, it has been confirmed that optical amplification with the optical fiber in accordance with the present invention yields substantially a flat and favorable amplification characteristic in a 1.58 μm band in which signal light has a wavelength ranging from 1.57 to 1.60 μm.

Next, using three kinds of optical fiber whose characteristics are listed in Table 2, tests for comparing their amplification characteristics were carried out. Fiber A is an optical fiber in accordance with the present invention, whereas fibers B and C are fibers prepared for comparison. The test conditions are identical to those in the above-mentioned amplification characteristic confirmation test except for the optical fibers.

TABLE 2

EDF Characteristic Values

| Characteristics | Characteristic values | | |
|---|---|---|---|
| EDF | A | B | C |
| Type | wholly doped | partly doped | wholly doped |
| Er atomic conc. of core region 11 | 1500 wt-ppm | 5000 wt-ppm | 1000 wt-ppm |
| Al atomic conc. of core region 11 | 9 wt % | 2 wt % | 5 wt % |
| Δn | 2.1% | 1.8% | 1.8% |
| λc | 1.45 μm | 1.1 μm | 1.1 μm |
| MFD | 4.5 μm | 4.6 μm | 4.6 μm |
| Effective core area | 21 μm² | 22 μm² | 22 μm² |

Figure 8:
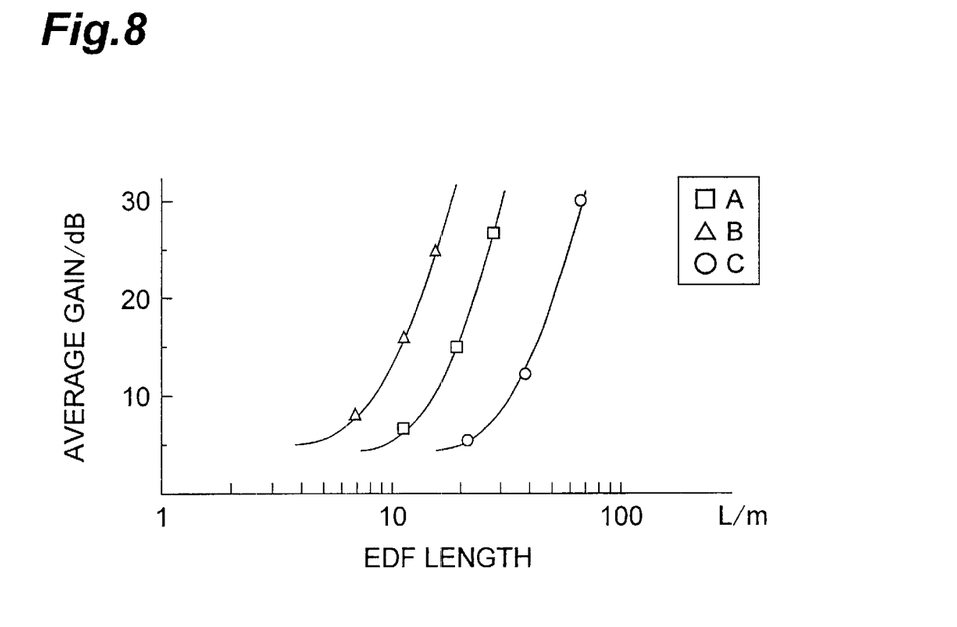
Figure 9:
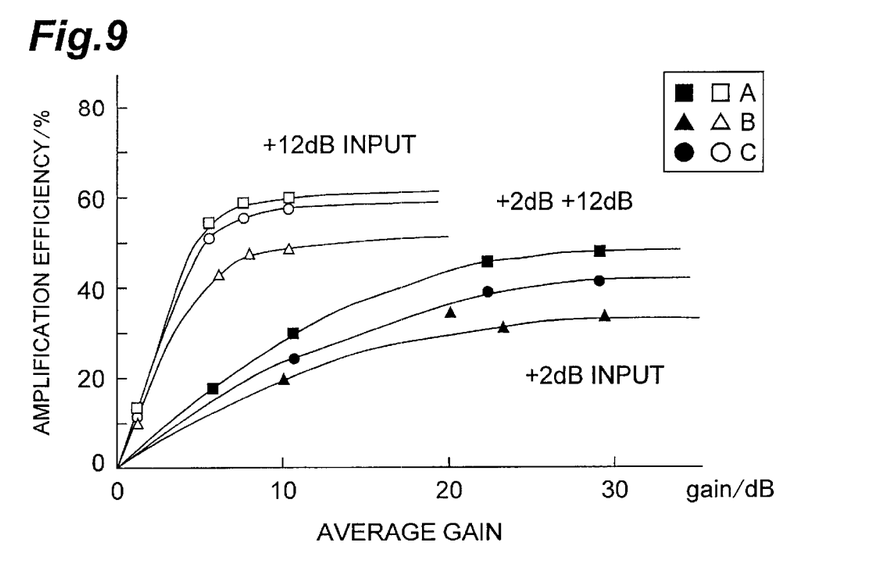
FIG. 9 is a graph showing relationships between gain and amplification efficiency with respect to quantity of pumping light.

FIG. 8 shows the dependence of gain upon EDF length. FIG. 9 shows relationships between gain and amplification factor with respect to quantity of pumping light. Each show in a collective form. EDF-A in accordance with the present invention yielded a gain per unit length of about 0.6 dB/m and such a favorable characteristic as a conversion efficiency (amplification efficiency) of 60% in the case of pumping light input of +12 dB with a gain of 10 dB. In EDF-B, by contrast, though its gain per unit length was 1.25 dB/m, which was higher than that of EDF-A in accordance with the present invention, its amplification factor was less than 50% in the case of pumping light input of +12 dB with a gain of 10 dB. In EDF-C, its gain per unit length was 0.33 dB/m, which was about half that of EDF-A, and its amplification efficiency was also somewhat lower than that of EDF-A. Thus, it has been confirmed that the EDF in accordance with the present invention can be used as an optical fiber for optical amplification which is excellent in both the gain per unit length and amplification efficiency.

Next, results of studies concerning the relationship between Er atomic concentration and amplification characteristic will be explained. The following explanation is concerned with the results obtained when several kinds of EDF with various Er atomic concentrations. Where the amount of doped Al, relative refractive index difference Δn, cutoff wavelength λc, and MFD were set to 5 wt %, 1.3%, 1.3 μm, and 5.5 μm, respectively. The inversion level was optimized so as to maximize the amplification efficiency in the 1.58 μm band with pumping light in the 1.48 μm band with the bi-directional pumping type optical fiber amplifier shown in FIG. 3.

Figure 10:
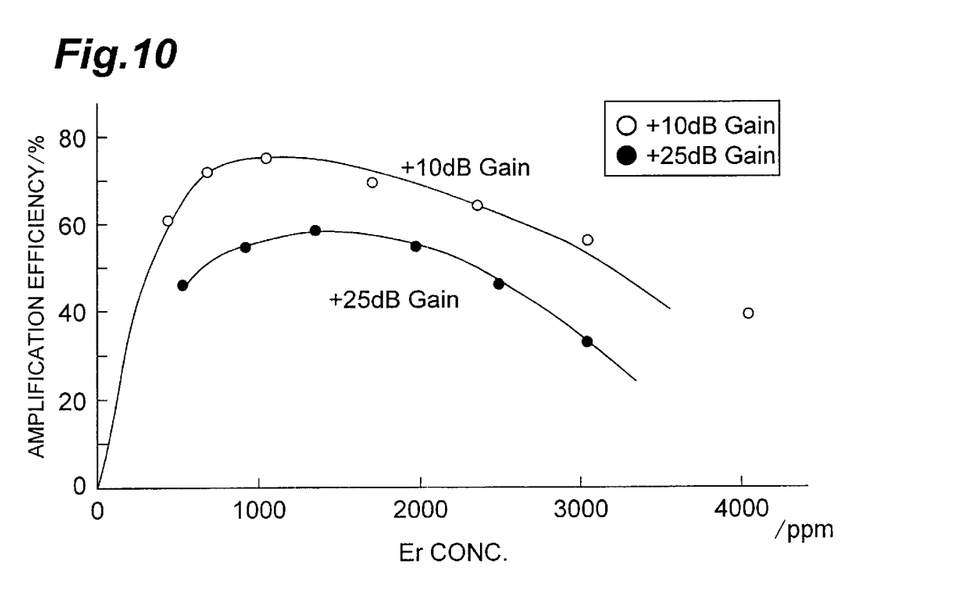

As shown in FIG. 10, the amplification efficiency reached its maximum of 75% when the Er atomic concentration was 1000 wt-ppm in the case where the amplification signal gain was +10 dB. The efficiency decreased both on the higher and lower concentration sides, with the amount of drop becoming greater on the lower concentration side. For example, an amplification efficiency of 60% or higher was securable when the Er atomic concentration was in the 450 to 2700 wt-ppm range. The amplification efficiency of 50% or higher was securable when the Er atomic concentration was in the 300 to 3300 wt-ppm range. In the case where the amplification signal gain was +25 dB, on the other hand, the Er atomic concentration where the amplification efficiency was maximized shifted to the higher concentration side as compared with the case with +10 dB so as to become about 1200 wt-ppm, and its maximum amplification efficiency was about 57%. In this case, an amplification efficiency of 50% or higher was securable when the Er atomic concentration was in the 600 to 2600 wt-ppm range.

Figure 11:
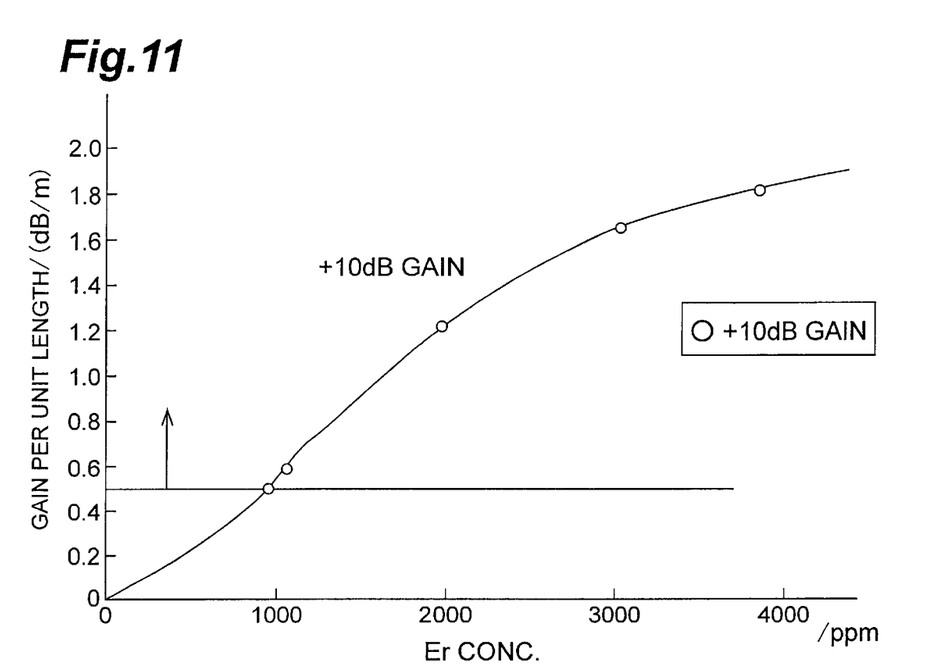
FIG. 11 is a chart showing the relationship between Er atomic concentration and gain per unit length.

FIG. 11 shows the relationship between the Er atomic concentration and gain per unit length in the case where the amplification signal gain is +10 dB. While the gain per unit length basically increases as the Er atomic concentration is higher, its rate of increase becomes gentler after the atomic concentration exceeds 1000 wt-ppm. It has been confirmed necessary for the Er atomic concentration to be 950 wt-ppm or higher in order to secure a gain per unit length of 0.5 dB/m or greater.

Next, results of studies concerning the amplification characteristic with various Al concentrations and Er concentrations will be discussed. Here, the amplification characteristic was studied using the bidirectional excitation system shown in FIG. 3, while the relative refractive index difference Δn, cutoff wavelength λc, and MFD of EDF were set to 1.3%, 1.3 μm, and 5.5 μm, respectively. The pumping wavelength was set to the 1.48-μm band, whereas the input signal light was set to +5 dB.

Figure 12:
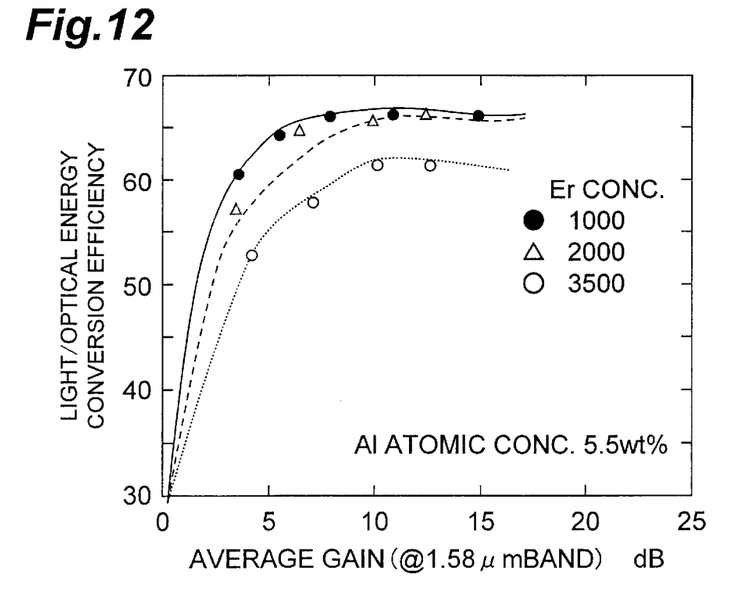
FIGS. 12 to 14 are graphs showing relationships between the average gain in the 1.58 $\mu$m band and the conversion efficiency in EDF with various Er atomic concentrations at Al atomic concentrations of 5.5 wt %, 1.2 wt %, and 8.5 wt %, respectively.
Figure 13:
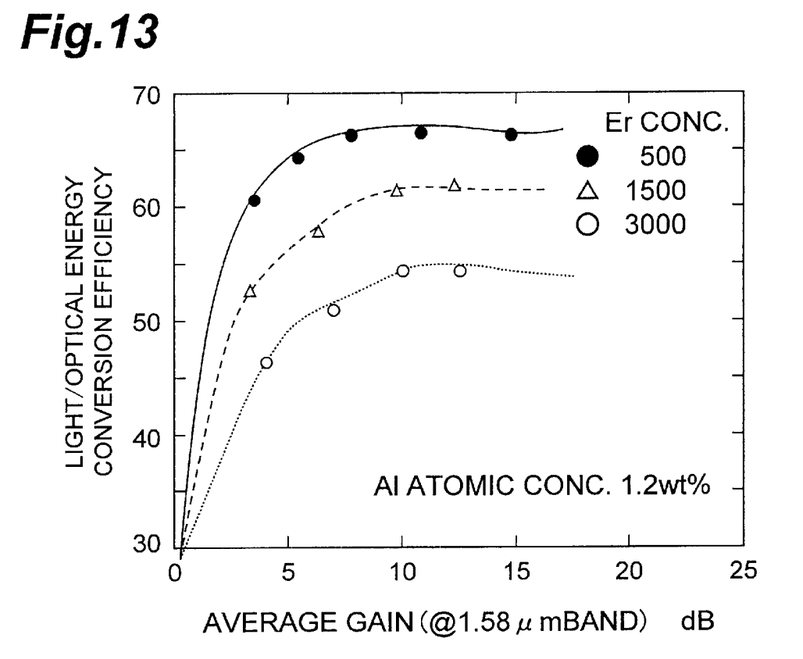
Figure 14:
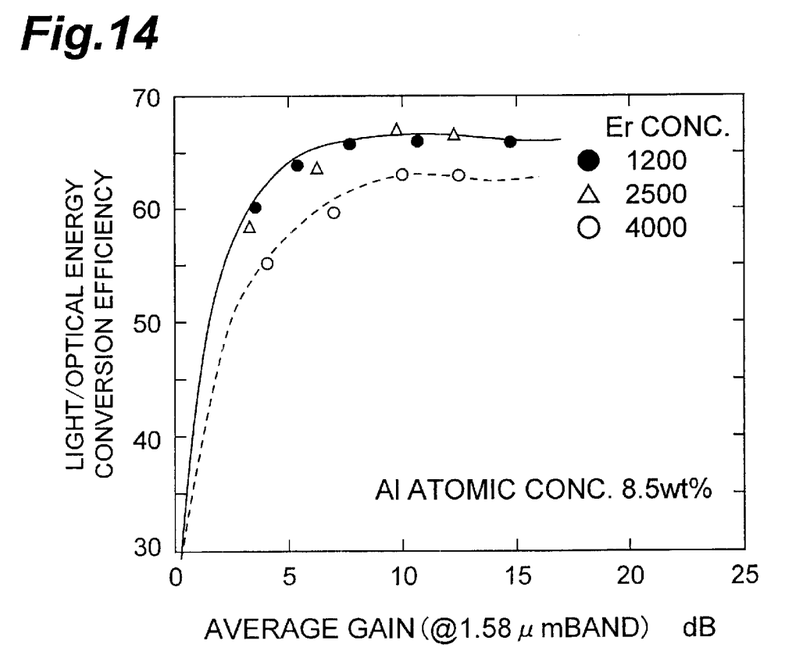
Figure 15:
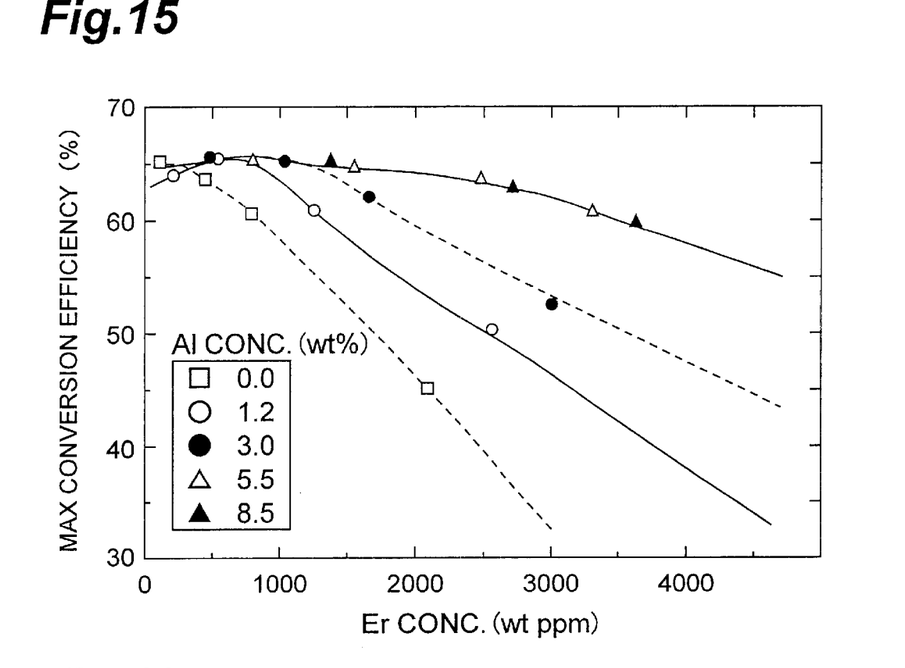
FIG. 15 is a graph showing relationships between maximum conversion efficiency and respective atomic concentrations of Al and Er.

FIGS. 12 to 14 show relationships between the average gain in the 1.58 μm band and the conversion efficiency in EDF with various Er atomic concentrations. These figures show relationships at Al atomic concentrations of 5.5 wt %, 1.2 wt %, and 8.5 wt %, respectively. FIG. 15 shows relationships between the maximum conversion efficiency and the respective atomic concentrations of Al and Er. Here, the maximum value of light/optical conversion efficiency obtained from FIGS. 12 to 14 is defined as maximum conversion efficiency.

As shown in FIGS. 12 to 14, it has been confirmed that the maximum conversion efficiency decreases as the Er concentration is higher. Also, as can be seen from FIG. 15, in the case where the amount of added Al was zero, the maximum conversion efficiency decreased more drastically as the Er concentration was higher. As the doped amount of Al was higher, the maximum conversion efficiency in the high concentration region of Er improved. In the case where the Al concentration was 5.5 wt % or 8.5 wt %, the maximum conversion efficiency of 60% was maintained even when the Er concentration exceeded 3000 wt-ppm.

Figure 16:
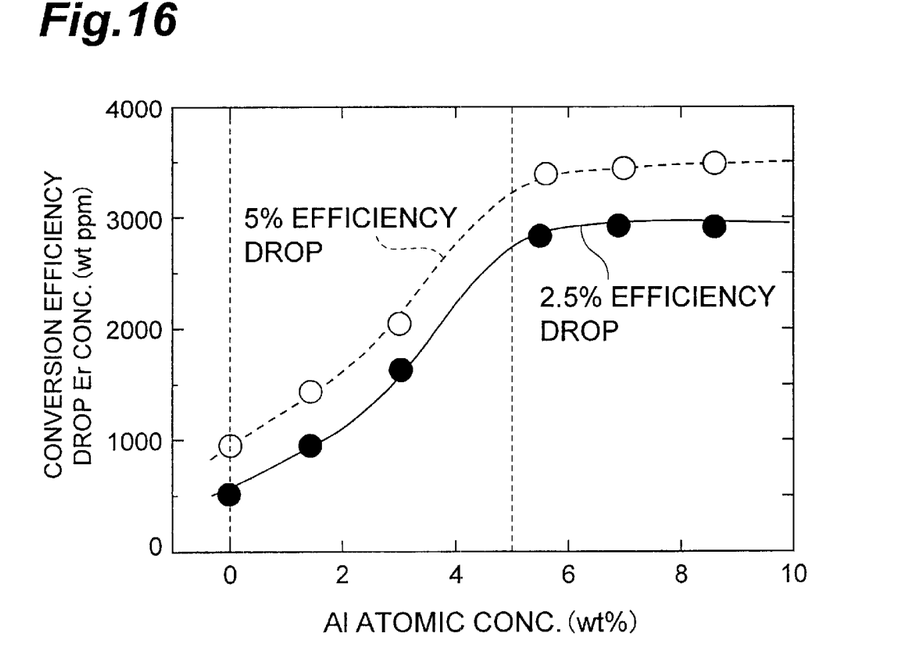
FIG. 16 is a graph showing relationships between Al atomic concentration and Er atomic concentrations at which conversion efficiency drops.

FIG. 16 shows a graph Er atomic concentrations (higher concentration side) at which the conversion efficiency drops by 2.5% and 5% from the maximum conversion efficiency plotted at individual Al concentrations. In either case, it has been found that the Er concentrations where the efficiency drops substantially become identical and maximized when the Al atomic concentration is 5% or higher. Therefore, if the Al atomic concentration is set to 5 wt % or higher, then a large amount of Er can be added thereto. It is considered to be due to the fact that the existence of Al atoms can prevent Er atoms from associating, thereby keeping the efficiency from decreasing due to the association of Er ions.

The inventors have found that, when the Al concentration is 5 wt % or higher, the gain per unit length G/L of the optical fiber for optical amplification in the 1.58 μm band can be expressed by:

$G/L$=added Er concentration [ppm]×absorption coefficient [dB/m/ppm]×confinement coefficient×0.033 (1)

The absorption coefficient in this expression is peak value of the 1.53 μm band, whereas 0.033 represents the gain ratio at 1.58 μm.

Figure 17:
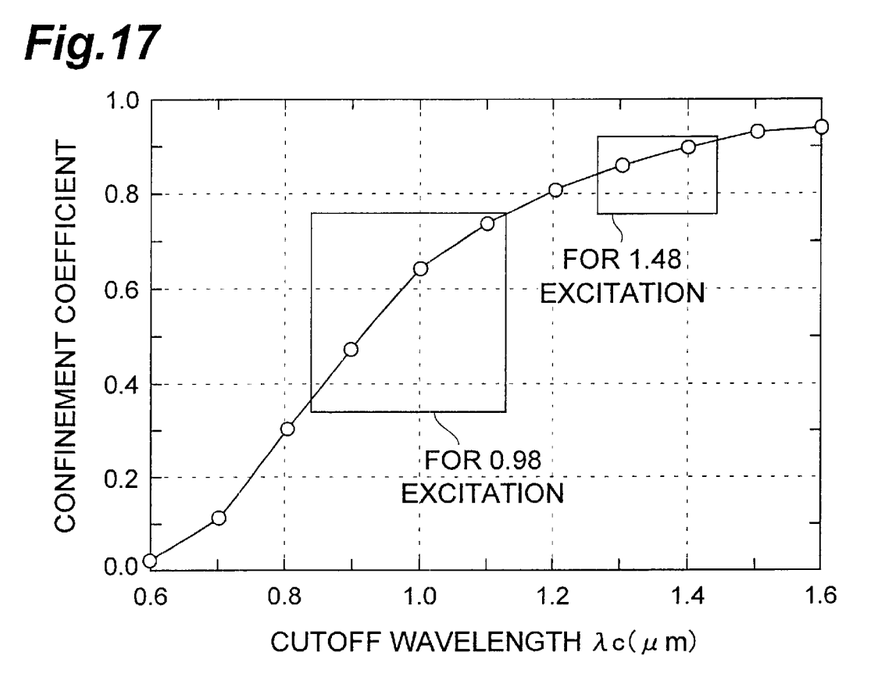
FIG. 17 is a graph showing the relationship between the cutoff wavelength and confinement coefficient in the optical fiber for optical amplification in accordance with the present invention.

FIG. 17 is a graph showing the relationship between the cutoff wavelength λc in the optical fiber for optical amplification in accordance with the present invention and the confinement coefficient. Here, the confinement coefficient is the overlap between the mode field of signal wavelength and the core portion doped with Er, and is a coefficient defined by the following expression:

$$\text{confinement coefficient} = \frac{\int_0^a rP(r)dr}{\int_0^\infty rP(r)dr} = \frac{\text{power in core}}{\text{power in whole field}}$$

where the optical power density at the distance of r from the core center is P(r).

When the optical amplification by pumping light is carried out by use of an optical fiber for optical amplification, pumping light in a band near the cutoff wavelength λc is employed. For example, when carrying out optical amplification with pumping light in the 1.48-μm band, an EDF whose cutoff wavelength λc is in the vicinity of 1.3 μm is employed as the optical fiber for optical amplification. As can be seen from FIG. 17, for achieving the confinement coefficient of 0.85 or higher, the cutoff wavelength λc is preferably from 1.3 to 1.5 μm. Since the absorption coefficient is 0.025 dB/m/ppm, on the other hand, in order for the G/L to become 0.5 dB/m, it will be sufficient if Er is added by 750 wt-ppm or more. More preferably, the concentration of added Er is 1000 wt-ppm or higher. From the viewpoint of concentration quenching, the concentration of added Er is preferably not higher than 3000 wt-ppm.

If MFD is small, then the signal waveform is likely to be deformed by self phase modulation when the dispersion value of fiber deviates from zero. When the dispersion value of fiber is near zero, by contrast, there is a possibility that nonlinear effects such as four-wave mixing may occur, thereby generating crosstalk between WDM signals. For reducing such self phase modulation and nonlinear effects, it is preferable that MFD be set larger. Further, when MFD is small, it is disadvantageous in that the coupling loss becomes greater at its connecting point with respect to another fiber.

Figure 18:
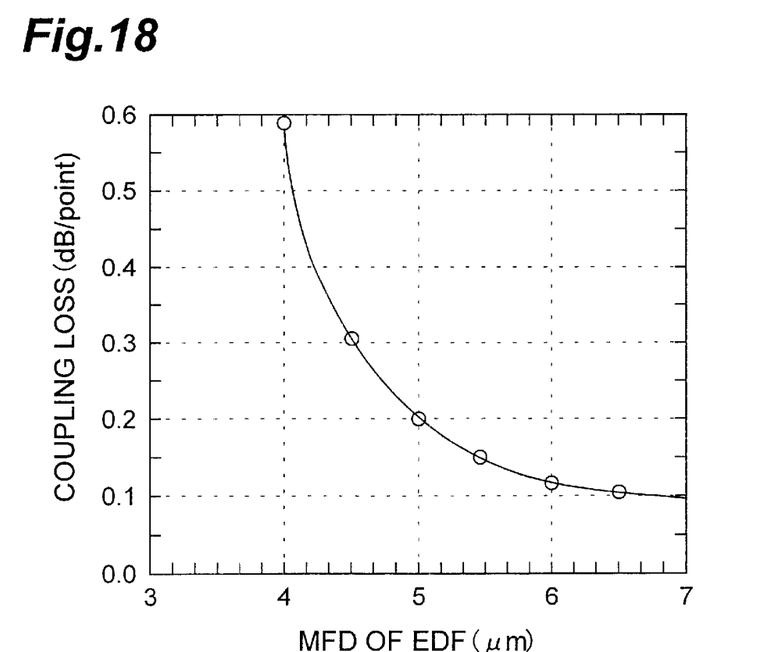
FIG. 18 is a graph plotting the relationships between the splicing loss and MFD of EDF when EDFs of the present invention are fusion-spliced to a standard single-mode fiber.

FIG. 18 is a graph plotting the coupling loss when an EDF in accordance with the present invention is fusion-spliced to a single-mode fiber (Δn=0.35%, λc=1.25 μm, and MFD= 10.2 μm at a wavelength of 1.55 μm), with respect to the MFD of EDF. An MFD of 5 μm or larger has been found preferable for suppressing the coupling loss to 0.2 dB/point or less, which is considered to be a favorable characteristic.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber for optical amplification used for 1.58 μm band signal light amplification, at least a core region thereof being doped with Er;

wherein at least a part of said core region is made of silica glass co-doped with Ge and Al together with Er whose average atomic concentration in said core region is from 1000 wt-ppm to 3000 wt-ppm inclusive, and cutoff wavelength is from 1.3 μm to 1.5 μm inclusive.

2. An optical fiber for optical amplification according to claim 1, wherein a mode field diameter in the 1.58 μm band of said optical fiber is 5 μm or more.

3. An optical fiber for optical amplification according to claim 1, wherein an Al atomic concentration in said core region is 1 wt % or more.

4. An optical fiber for optical amplification according to claim 3, wherein an Al atomic concentration in said core region is from 5 wt % to 20 wt % inclusive.

5. An optical fiber amplifier for 1.58 μm band signal light amplification with an optical fiber for optical amplification in which at least a core region is doped with Er, said optical fiber amplifier comprising:

a pumping light source which emits pumping light in a 1.48-μm band for exciting said optical fiber for optical amplification;

a multiplexer/demultiplexer which introduces the pumping light emitted from said pumping light source into said optical fiber for optical amplification on which the signal light is incident; and optical isolators respectively disposed at input and output ends of the signal light;

wherein at least a part of said core region of said optical fiber for optical amplification is made of silica glass co-doped with Ge and Al together with Er whose average Er atomic concentration of said core region is from 1000 wt-ppm to 3000 wt-ppm inclusive, and cutoff wavelength is from 1.3 μm to 1.5 μm.

6. An optical fiber amplifier according to claim 5, wherein a mode field diameter of said optical fiber for optical amplification in the 1.58 μm band is 5 μm or more.

* * * * *